May 19, 1925.
F. E. GALLAGHER ET AL
1,538,793
DENSOMETER FOR TESTING FABRICS
Filed Oct. 25, 1922     2 Sheets-Sheet 1
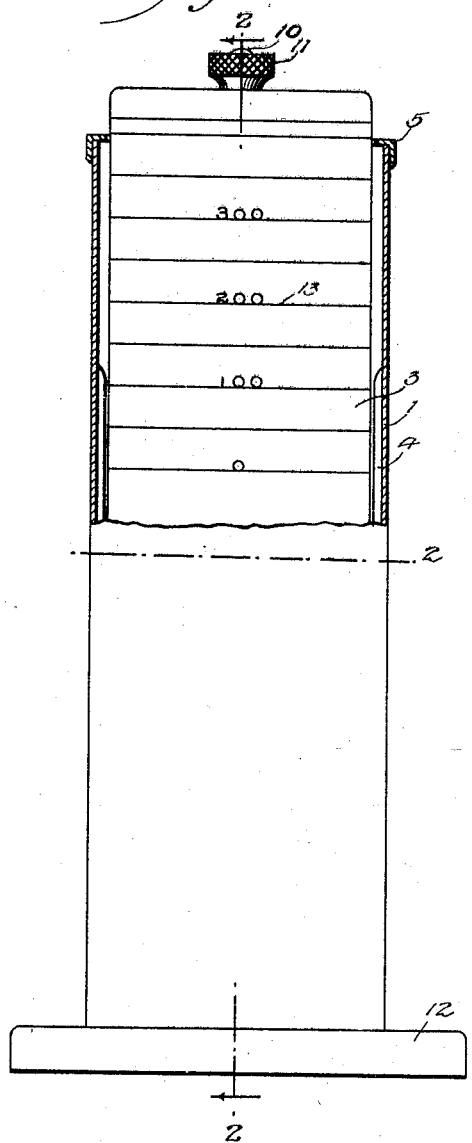
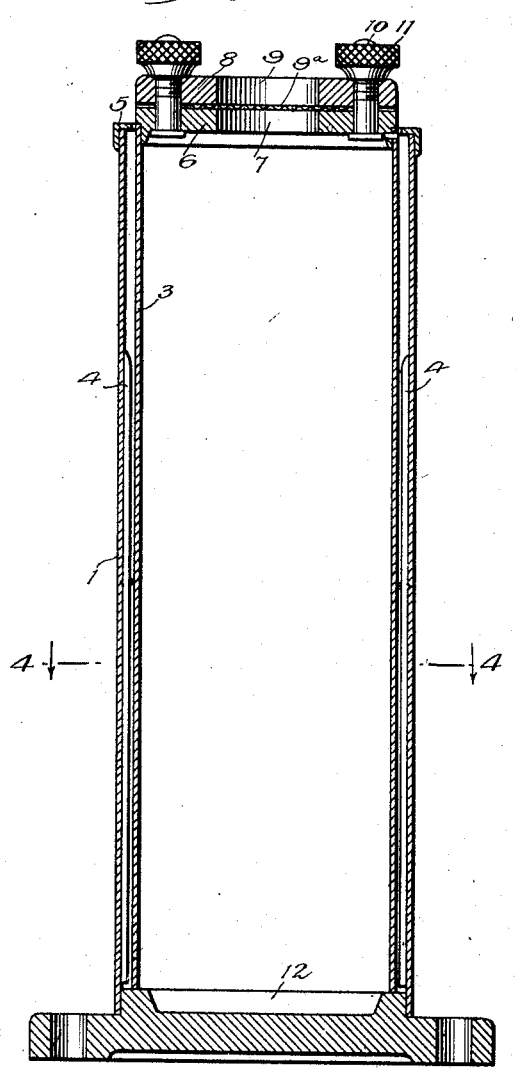
WITNESSES
INVENTORS
Francis E. Gallagher
William M. Peckham
BY
ATTORNEYS

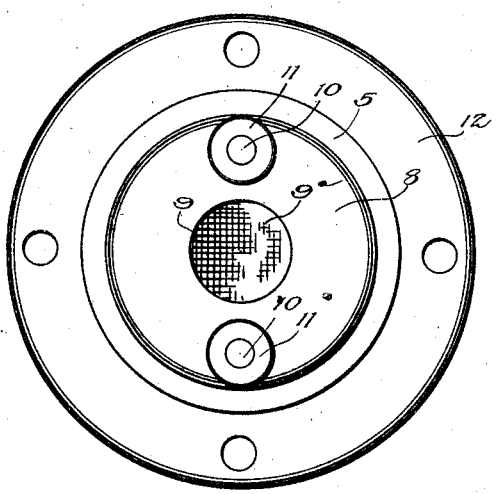
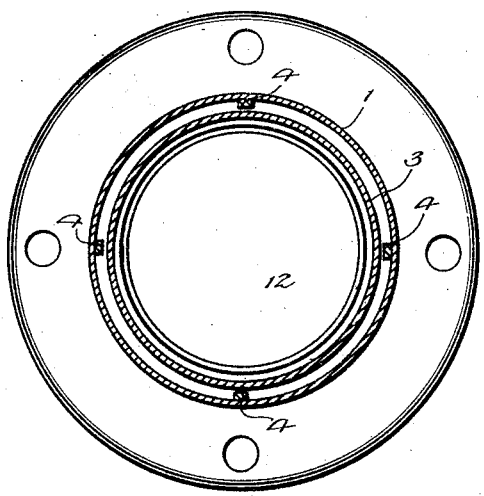

Patented May 19, 1925.

1,538,793

UNITED STATES PATENT OFFICE.

FRANCIS E. GALLAGHER AND WILLIAM M. PECKHAM, OF TROY, NEW YORK.

DENSOMETER FOR TESTING FABRICS.

Application filed October 25, 1922. Serial No. 596,841.

*To all whom it may concern:*

Be it known that we, FRANCIS E. GALLAGHER and WILLIAM M. PECKHAM, citizens of the United States, and residents of Troy, in the county of Rensselaer and State of New York, have invented a new and Improved Densometer for Testing Fabrics, of which the following is a full, clear, and exact description.

This invention relates to a testing implement or densometer, and an object of the invention is to provide an instrument designed to test the physical construction of paper, cloth, etc., to measure the density of material or the compactness of the fibres and, inversely to test the porosity or openness of the sheet.

The idea of "construction" as relating to a sheet or web of material is familiar to the textile trade, who express the construction of cloth as to the size of the yarns used and the number of the yarns in each direction and the way they are woven. The instrument designed in accordance with our invention makes possible a somewhat similar conception of the makeup of a sheet of paper or other material in terms of the compactness of the fibre which is of great value in indicating the suitability of a particular piece of material to meet many of the physical and technical demands made on it. The paper manufacturer has recognized in a general way that he has had no definite way of expressing a number of factors related to the density of the sheet, which our invention now makes possible to accurately measure and definitely express. The manufacturer has used general terms, such as "short", "long", "free", "close", "slow" and "open", to express the character of the fabric, and has recognized the importance of these different qualities as relating to his product without being able to assign to them a definite measure. Our instrument aims to give a definite measure of the character of the fabric being tested, a result which can readily be ascertained without any complicated operations.

For use in paper manufacturing plants in testing paper as made on the paper machine, the density of the paper is directly dependent upon the length of the fibre. This is controlled by the beating operation, either in the beaters or the jordan. More beating shortens the fibre and further hydrates the stock, both of which increase the density of the finished product. The regulation of the length of fibre has always been difficult for the paper maker to judge and measure. By testing the paper with our densometer the beating effect can be maintained at a uniform value. These tests will also help to regulate calendering, since calendering increases the compactness or density of the sheet. Tests on samples before and after calendering will offer a check or control on this operation.

The coating of the paper with any material, such as animal size, gelatine, starch mixtures, lithographic coatings, etc., will add to the compactness or density of the final sheet. This can be accurately measured by tests in our device on coated or uncoated paper. The penetration of nearly all mixtures, liquids and solutions which are applied to paper are directly related to the compactness or density of the sheet and their effect can be readily measured. In other words, this instrument can be used to indicate clearly the effect of the different operations on the density of the paper throughout its manufacture and the effect of adding different materials to the paper to produce one kind or another of surface thereon. The device can be used also to measure the compactness or density of cloth and similar materials and also the same materials after having been treated or filled with different agents.

The invention is illustrated particularly in the drawings, which are merely illustrative of one form which the invention may assume, and it is, of course, understood that the construction and arrangement of the parts and the character of the materials used may be varied without departing from the scope of the invention as defined.

In the drawings, Figure 1 represents an elevation of the device with the upper part of the outer cylinder cut away to show the disposition of the inner cylinder therein and the graduations marked on the inner cylinder.

Fig. 2 is a vertical section taken on the line 2—2 of Figure 1.

Fig. 3 is a plan view of the device.

Fig. 4 is a horizontal section taken on the line 4—4 of Fig. 2.

The form of the invention illustrated comprises a cylindrical vessel or container 1 within which a liquid, such as water, is adapted to be placed at a level approximately indicated by the dot-and-dash line and the numeral 2 in Fig. 1. Within this outer cylinder an inner cylinder 3 is placed and is adapted to move up and down within the outer cylinder. This inner cylinder or container is guided in its movement within the outer cylinder by means of guide blades 4 which are preferably fastened to the inner walls of the outer cylinder and project inwardly therefrom a desired distance. These guide blades are provided because the inner cylinder is somewhat smaller than the outer cylinder and yet it is desired that its movement laterally within the outer cylinder be confined within very narrow limits and with the minimum friction. The upper end of the outer cylinder is provided with a flange-like rim 5 which projects inwardly a short distance from the edge of the outer cylinder to a point very close to the outer surface of the inner cylinder. The upper end of the inner cylinder is provided with a ringlike cap which may be suitably fastened thereto, this cap having an aperture 7 preferably centrally located therein. On this cap 6 a second ring 8 is disposed and has an opening 9 therein adapted preferably to be alined with the aperture 7 in the cap 6. These two rings or caps or plates, as they may at will be called, are held together by means of clamping screws or bolts 10 on the ends of which clamping nuts are adjustable. Between the two plates and across the apertures there is to be disposed a small portion or sheet of the material 9ª which is to be tested. This material, of course, may be any desired material the density or porosity of which is under consideration. The bottom of the outer cylinder 1 is suitably fastened to a base plate 12 and normally the bottom of the inner cylinder 3 is adapted to rest on this plate or base.

In the operation of the device, a small portion of the fabric to be tested is clamped between the two caps or rings 6 and 8 as above described; the outer vessel is filled with the desired amount of liquid; the inner container is then raised until its lower edge is above the level of the liquid in the outer vessel. At this time the inner vessel will be filled with air. The inner vessel is then moved down so that its lower end projects into the liquid. The inner vessel, due to its weight and the weight of the attached parts, will, therefore, sink in the liquid until the pressure of the air within the inner vessel counterbalances the effect of the weight. Air can then escape from the inner vessel only by flowing through the apertures or holes 7 and 9 through the material to be tested. The air within the inner vessel is under a definite pressure, due to the fixed weight of the inner cylinder and its attachment. The outer surface of the inner cylinder is graduated, as indicated by the numeral 13 in Fig. 1, and is graduated, preferably, in terms of volumes of air or gas so that the quantity of air forced through the fabric being tested in a given interval of time can be readily read. The time required for this definite amount of air to flow through the sample, or the quantity of air flowing through in a given amount of time, gives the necessary measure of the compactness or density of the sample under test. It is, of course, understood that the same idea can be mechanically worked out in a number of other ways than by having the sample of material directly connected to the inner cylinder.

What we claim is:—

1. A device for testing material, which includes a receptacle containing liquid, a second receptacle within the first receptacle and having an open bottom and top, and means on the top of the second receptacle for stretching the material to be tested tightly thereacross, said second receptacle resting on the liquid within the first receptacle, the weight of the second receptacle creating a definite pressure of gas therewithin whereby the gas within the receptacle tends to escape through the material at a definite rate in accordance with its porosity.

2. A device for testing material, which includes a receptacle containing liquid and a second open-ended receptacle disposed within the first receptacle, the open end of the second receptacle extending into the liquid whereby the gas contained therein will be under a definite pressure, said second receptacle adapted to float on the liquid and having an aperture therein across which the material to be tested is disposed, whereby the gas within the receptacle can only escape through the material, and means for holding said material stretched across said aperture.

3. A device for testing material which includes a cylindrical tank containing a liquid, an open-bottomed cylinder disposed within the first cylinder, an apertured cap closing the upper end of the inner cylinder, and means for clamping a portion of material across said aperture, the lower end of the inner cylinder adapted to extend into the liquid and to be supported therein, the weight of the inner cylinder creating a gas pressure therewithin which can only be relieved by the escape of the gas through the material.

4. A testing device for material which includes an outer cylinder containing liquid, an inner cylinder adapted to rise and float therein, the lower end of the inner cylinder being open and normally adapted to extend into the liquid to trap gas within the inner cylinder, a plurality of guide blades on the inner walls of the outer cylinder projecting therefrom to limit the lateral movement of the inner cylinder, a flangelike rim on the upper end of the outer cylinder lying closely adjacent the surface of the inner cylinder, said inner cylinder having a plurality of graduations on its outer surface, an apertured cap disposed on the upper end of the inner cylinder, a similarly apertured ringlike cap disposed over said first mentioned cap, a clamping means for adjusting said cap together, and a portion of material adapted to be clamped between said caps across the apertures therein whereby the pressure within the inner cylinder can be relieved only by the escape of gas from the inner cylinder through the material, the rate of flow of the gas from the inner cylinder indicating the porosity or density of the material.

FRANCIS E. GALLAGHER.
WILLIAM M. PECKHAM.